United States Patent
Kitamura (10) Patent No.: US 8,180,990 B2
(45) Date of Patent: May 15, 2012

(54) INTEGRATED CIRCUIT INCLUDING A PLURALITY OF MASTER CIRCUITS TRANSMITTING ACCESS REQUESTS TO AN EXTERNAL DEVICE AND INTEGRATED CIRCUIT SYSTEM INCLUDING FIRST AND SECOND INTERATED CIRCUITS EACH INCLUDING A PLURALITY OF MASTER CIRCUITS TRANSMITTING ACCESS REQUESTS

(75) Inventor: Tomohiko Kitamura, Osaka (JP)

(73) Assignee: Panasonic Corporation, Osaka (JP)

( * ) Notice: Subject to any disclaimer, the term of this patent is extended or adjusted under 35 U.S.C. 154(b) by 603 days.

(21) Appl. No.: 12/282,058

(22) PCT Filed: Jan. 19, 2007

(86) PCT No.: PCT/JP2007/050817
§ 371 (c)(1),
(2), (4) Date: Sep. 8, 2008

(87) PCT Pub. No.: WO2007/105376
PCT Pub. Date: Sep. 20, 2007

(65) Prior Publication Data
US 2009/0013144 A1    Jan. 8, 2009

(30) Foreign Application Priority Data

Mar. 10, 2006 (JP) .................................. 2006-066753

(51) Int. Cl.
*G06F 12/00* (2006.01)
(52) U.S. Cl. ................................ 711/168; 711/E12.001
(58) Field of Classification Search .................. 711/168, 711/E12.001
See application file for complete search history.

(56) References Cited

U.S. PATENT DOCUMENTS

| 6,182,192 | B1 | 1/2001 | Rovati | |
|---|---|---|---|---|
| 7,254,688 | B2 | 8/2007 | Uneme | |
| 2004/0117530 | A1* | 6/2004 | Endo et al. | 710/113 |
| 2004/0143690 | A1* | 7/2004 | Mitsuishi | 710/107 |
| 2006/0149884 | A1* | 7/2006 | Saen et al. | 710/309 |

FOREIGN PATENT DOCUMENTS

| EP | 0 803 820 A2 | 10/1997 |
|---|---|---|
| JP | 7-311730 | 11/1995 |
| JP | 2004-102779 | 4/2004 |
| JP | 2006-252454 | 9/2006 |
| WO | 2007/004696 | 1/2007 |

OTHER PUBLICATIONS

International Search Report issued Apr. 24, 2007 in the International (PCT) Application of which the present application is the U.S. National Stage.
Supplementary European Search Report issued Sep. 7, 2011 in corresponding European Application No. 0 770 7105.8.

* cited by examiner

*Primary Examiner* — Mardochee Chery
(74) *Attorney, Agent, or Firm* — Wenderoth, Lind & Ponack, L.L.P.

(57) ABSTRACT

A main LSI includes a plurality of master circuits transmitting access requests to a SDRAM, and includes an input interface receiving an access request from a master circuit in a sub LSI. Further, the main LSI includes an arbitration circuit receiving the access requests from the internal master circuits and from the input interface, sequentially selecting, in accordance with a predetermined arbitration rule, a master circuit to be allowed to access the SDRAM, and determining output timings for addresses pertaining to the data transfers from the sequentially selected master circuits. The main LSI also includes an access signal generation circuit causing the sequentially selected master circuits to access the SDRAM in accordance with the corresponding output timings.

7 Claims, 6 Drawing Sheets

(a) (1 LSI)

| RECEPTION ORDER | Req SIGNAL LINE | COMMAND | TRANSFER AMOUNT |
|---|---|---|---|
| 1 | Req A | Write A | 4 |
| 2 | Req B | Write B | 8 |
| 3 | Req C | Write C | 4 |
| ... | ... | ... | ... |

(b) (2 LSIs)

| RECEPTION ORDER | Req SIGNAL LINE | COMMAND | TRANSFER AMOUNT |
|---|---|---|---|
| 1 | Req b | Write b | 8 |
| 2 | Req a | Write a | 4 |
| 3 | Req c | Write c | 4 |
| ... | ... | ... | ... |

(c)

| RECEPTION ORDER | Req SIGNAL LINE | COMMAND | TRANSFER AMOUNT |
|---|---|---|---|
| 1 | Req A | Write A | 4 |
| 2 | EXTERNAL Req | Write | 8 |
| 3 | Req C | Write C | 4 |
| ... | ... | ... | ... |

FIG. 3

FIG. 6

INTEGRATED CIRCUIT INCLUDING A PLURALITY OF MASTER CIRCUITS TRANSMITTING ACCESS REQUESTS TO AN EXTERNAL DEVICE AND INTEGRATED CIRCUIT SYSTEM INCLUDING FIRST AND SECOND INTERATED CIRCUITS EACH INCLUDING A PLURALITY OF MASTER CIRCUITS TRANSMITTING ACCESS REQUESTS

TECHNICAL FIELD

The present invention relates to memory sharing, and in particular to technology for the sharing of an external memory between a plurality of integrated circuits.

BACKGROUND ART

The patent documents listed below disclose technologies for sharing a memory such as an SDRAM (Synchronous Dynamic Random Access Memory).

Patent document 1 discloses technology in which, in a case where a plurality of data processing apparatuses that each include a CPU (Central Processing Unit) etc. are accessing a single shared SDRAM, selective switching is performed to determine the data processing apparatus that is to access the SDRAM. The technology of patent document 1 prevents malfunctions in the SDRAM due to an unstable condition that occurs when the supply of a control signal to the SDRAM is stopped during switching of the data processing apparatuses, thereby enabling the data processing apparatuses to stably access the SDRAM.

Patent document 2 discloses technology for improving the utilization efficiency of a data bus when a plurality of processors accesses a synchronous DRAM. In the technology of patent document 2, timeslots in which the processors can perform access are set in advance, and each processor accesses the synchronous DRAM during the corresponding time slot.

Also, there is technology in which, in a case where a plurality of processors etc. are implemented on a single integrated circuit and share an SDRAM, when access requests have been output from the processors etc., commands and addresses pertaining to the access requests are sequentially input to the SDRAM in accordance with a preset arbitration rule that indicates an order in which the processors etc. are to access the SDRAM. This technology takes into account the fact that when an input of read or write commands and addresses are received from the processors etc., the SDRAM waits until a predetermined number of clock cycles have elapsed before reading or writing data. In this technology, data transfer is performed in uninterrupted succession by receiving an input of a command and address before data reading or writing pertaining to the previous command and address has been completed, thereby improving the utilization efficiency of the data bus.

Patent document 1: Japanese Patent Application Publication No. 2004-102779

Patent document 2: Japanese Patent Application Publication No. H07-311730

DISCLOSURE OF THE INVENTION

Problems Solved by the Invention

In recent years there has been demand for higher performance and more functions in digital information devices etc., and there are cases in which it is desirable to add a new function to an existing integrated circuit.

In such cases, due to the factors of efficiency and economics, rather than remaking an integrated circuit so as to have the new function, it is desirable to manufacture an integrated circuit having only the new functional portion, connect the new integrated circuit to the existing integrated circuit, and cause the new integrated circuit to use an SDRAM used by the existing integrated circuit. In this case, it is desirable to control access by the integrated circuits so that the utilization efficiency of the data bus is similar to a case where data transfer is performed by a signal integrated circuit.

However, if the existing integrated circuit was not manufactured with the anticipation that an external integrated circuit would be connected thereto, even when the technology disclosed in the above patent documents is used to arbitrate access to the SDRAM by the newly manufactured integrated circuit, commands etc. pertaining to the access request of one of the integrated circuits cannot be output until the data transfer pertaining to an immediately previous access request from the other integrated circuit has been completed.

The present invention has been achieved in view of the situation described above, and an aim thereof is to provide an integrated circuit and integrated circuit system that arbitrate access requests from processors etc. included in a plurality of integrated circuits that share a recording device such as an SDRAM, and control access to the recording device so that the data transfer efficiency is improved over conventional technology.

Means to Solve the Problems

In order to solve the above problems, one aspect of the present invention is an integrated circuit chip including a plurality of internal master circuits that share an external recording device and that each transmit an access request including an address for a transfer of data to or from the recording device, the integrated circuit chip controlling access by the internal master circuits by selectively causing one of the internal master circuits to access the recording device, and the integrated circuit chip including: an input interface operable to receive an access request from an external master circuit; and an access control circuit operable to, in a case where the input interface receives the access request from the external master circuit before an end of a data transfer based on the access request from the selected internal master circuit, control access to the recording device by (i) determining an output timing for an address indicated by the access request from the external master circuit, the address output timing being determined so that the address is output during the data transfer in accordance with the access request from the selected internal master circuit, and (ii) causing the external master circuit to access the recording device in accordance with the determined output timing.

EFFECTS OF THE INVENTION

In a case where the recording device is an SDRAM or the like to which addresses and the like can be output before data transfer is actually performed, and where the integrated circuit of the present invention is connected to an external integrated circuit that includes a master circuit such as a processor that accesses the same SDRAM, the above structure of the present invention enables controlling access to the recording device as if the master circuit in the external integrated circuit were an internal master circuit. Specifically, the integrated circuit chip of the present invention first selects an internal master circuit to access the SDRAM. If an access request is received from the external master circuit before the data transfer performed by the selected internal master circuit has ended, the integrated circuit chip of the present invention determines the output timing of the address pertaining to the access request from the external master circuit so that this address is output during the immediately preceding data transfer performed by the selected internal master circuit, thereby causing the external master circuit to perform a data transfer immediately after the data transfer of the selected internal master circuit. Accordingly, this structure eliminates the problem of the prior art in which an address pertaining to a data transfer to/from a master circuit in one integrated circuit cannot be output until the data transfer to/from another integrated circuit has ended, thereby enabling data transfers to be performed as if the external master circuit were an internal master circuit.

Also, the integrated circuit chip may further include: an output interface operable to externally output timing information that indicates the output timing for the address indicated by the access request from the external master circuit, wherein the access control circuit may include: an arbitration circuit operable to, in a case where access requests have been received from the external master circuit and one or more of the internal master circuits, sequentially (i) select, from among the master circuits from which the access requests have been received, a master circuit to be caused to access the recording device, and (ii) determine an output timing for an address indicated by the access request from the selected master circuit; and an access signal generation circuit operable to generate an access signal in accordance with the access signal received from the selected internal master circuit, in a case where the arbitration circuit selects the external master circuit as the master circuit to be caused to access the recording device, the output interface may output the timing information indicating the output timing for the address indicated by the access request from the external master circuit, in a case of selecting one of the internal master circuits as the master circuit to be caused to access the recording device, the arbitration circuit may output an arbitration result indicating the selected internal master circuit to the access signal generation circuit, and the access signal generation circuit may generate the access signal in accordance with the selected internal master circuit indicated by the arbitration result information, and outputs the generated access signal to the recording device.

According to this structure, when causing the external integrated circuit connected to the integrated circuit of the present invention to access the recording device, the arbitration circuit outputs an output timing for at least an address to the external integrated circuit, and the access signal generation circuit controls data transfers pertaining to access requests from the internal master circuits. Therefore, processing pertaining to data transfers is divided between the integrated circuits, even when the number of externally connected integrated circuits increases.

Another aspect of the present invention is an integrated circuit chip including a plurality of internal master circuits that share an external recording device and that each transmit an access request including an address for a transfer of data to or from the recording device, the integrated circuit chip controlling access by the internal master circuits by selectively causing one of the internal master circuits to access the recording device, and the integrated circuit chip including: an input interface operable to receive an access request from an external master circuit; and an access control circuit operable to, with reference to the access requests received from the external master circuit and one or more of the internal master circuits, control access to the recording device in accordance with a predetermined condition by (i) selecting one of the internal master circuits and causing the selected internal master circuit to perform a data transfer with the recording device, (ii) causing the external master circuit to perform a data transfer with the recording device after the data transfer performed by the selected internal master circuit, (iii) determining an output timing for each address pertaining to the access requests to be a predetermined time period prior to a timing of the data transfer pertaining to the address, regardless of whether the determined output timing overlaps with another data transfer, and (iv) causing the internal master circuits and the external master circuit to access the recording device in accordance with the respective output timing.

In a case where an access request is received from an internal master circuit and then an access request is received from an external master circuit, and where the data transfer based on the access request from the internal master circuit is caused to be performed before the data transfer based on the access request from the external master circuit, the predetermined condition is that the latter data transfer is performed as soon as possible after the former data transfer has ended. In accordance with this condition, regardless of whether the period of the former data transfer overlaps with the output period of the address pertaining to the next transfer, the access control circuit determines the output timing for the address pertaining to the next data transfer so that this address is output while the former data transfer is being performed. According to this structure, even when the master circuit accessing the recording device switches from an internal master circuit to an external master circuit, data transfers performed by the internal and external master circuits can be performed with the same efficiency as if all of the master circuits were included in a single integrated circuit.

Another aspect of the present invention is an integrated circuit chip including a plurality of internal master circuits that share an external recording device and that each transmit an access request including an address for a transfer of data to the recording device, the integrated circuit chip controlling access performed by the internal master circuits by selectively causing one of the internal master circuits to access the recording device, and the integrated circuit chip including: an output interface operable to output the access requests to an external device; an input interface operable to receive, from the external device, timing information that indicates a plurality of output timings in one-to-one correspondence with the addresses indicated by the output access requests; and an access control circuit operable to receive the access requests from the internal master circuits, cause the output interface to sequentially output the received access requests to the external device in accordance with a predetermined rule, receive the timing information from the input interface, and perform control so as to cause the internal master circuits that transmitted the output access requests to perform access in accordance with the received timing information.

According to this structure, the integrated circuit of the present invention includes an input interface for receiving, from an external device, output timings for addresses pertaining to access requests received from internal master circuits. Therefore, in a case of being connected to another integrated circuit that can send output timings for the addresses pertaining to the access requests received from the internal master circuits, the integrated circuit of the present invention can receive data transfer timings from the other integrated circuit and access the recording device in accordance with the received data transfer timings.

Another aspect of the present invention is an integrated circuit system including a first integrated circuit chip and a second integrated circuit chip that share an external recording device, the first integrated circuit chip including: a plurality of master circuits each operable to transmit an access request including an address for a transfer of data to the recording device; an input interface operable to receive an access request from a master circuit included in the second integrated circuit chip; an output interface operable to output, to the second integrated circuit chip, timing information that indicates an output timing for an output of an address to the recording device; and an access control circuit operable to, in a case where the input interface receives the access request from the master circuit in the second integrated circuit chip before an end of a data transfer based on an access request from a selected master circuit in the first integrated circuit chip, control access to the recording device by (i) determining an output timing for an address indicated by the access request from the master circuit in the second integrated circuit chip, the address output timing being determined so that the address is output during the data transfer in accordance with the access request from the selected master circuit in the first integrated circuit chip, and (ii) causing the master circuit in the second integrated circuit chip to access the recording device in accordance with the determined output timing, and the second integrated circuit chip including: a plurality of master circuits each operable to transmit an access request including an address for a transfer of data to the recording device; an output interface operable to output the access requests from the master circuits in the second integrated circuit chip to the first integrated circuit chip; an input interface operable to receive the timing information from the first integrated circuit chip; and an access control circuit operable to receive the access requests from the master circuits in the second integrated circuit chip, cause the output interface to sequentially output the received access requests to the first integrated circuit chip in accordance with a predetermined rule, receive the timing information from the input interface, and perform control so as to cause the master circuits in the second integrated circuit that transmitted the output access requests to perform access in accordance with the received timing information.

Another aspect of the present invention is a data processing apparatus including a first integrated circuit chip, a second integrated circuit chip, and a recording device, the first integrated circuit chip including: a plurality of master circuits each operable to transmit an access request including an address for a transfer of data to the recording device; an input interface operable to receive an access request from a master circuit included in the second integrated circuit chip; an output interface operable to output, to the second integrated circuit chip, timing information that indicates an output timing for an output of an address to the recording device; and an access control circuit operable to, in a case where the input interface receives the access request from the master circuit in the second integrated circuit chip before an end of a data transfer based on an access request from a selected master circuit in the first integrated circuit chip, control access to the recording device by (i) determining an output timing for an address indicated by the access request from the master circuit in the second integrated circuit chip, the address output timing being determined so that the address is output during the data transfer in accordance with the access request from the selected master circuit in the first integrated circuit chip, and (ii) causing the master circuit in the second integrated circuit chip to access the recording device in accordance with the determined output timing, and the second integrated circuit chip including: a plurality of master circuits each operable to transmit an access request including an address for a transfer of data to the recording device; an output interface operable to output the access requests from the master circuits in the second integrated circuit chip to the first integrated circuit chip; an input interface operable to receive the timing information from the first integrated circuit chip; and an access control circuit operable to receive the access requests from the master circuits in the second integrated circuit chip, cause the output interface to sequentially output the received access requests to the first integrated circuit chip in accordance with a predetermined rule, receive the timing information from the input interface, and perform control so as to cause the master circuits in the second integrated circuit that transmitted the output access requests to perform access in accordance with the received timing information.

According to this structure, the first integrated circuit chip and the second integrated circuit chip are connected together so as to enable the transfer of access requests from the second integrated circuit chip and the transfer of timing information indicating output timings for addresses pertaining to the access requests from the master circuits in the second integrated circuit chip. Accordingly, the first integrated circuit arbitrates access requests from master circuits in both of the integrated circuit chips in accordance with a predetermined arbitration rule, thereby enabling determining access timings for the master circuits so that data transfers from the master circuits in both of the integrated circuit chips are performed in uninterrupted succession. Also, the second integrated circuit chip can cause the master circuits included therein to perform data transfers in accordance with timings received from the first integrated circuit chip, thereby enabling data transfer processing to be divided between both of the integrated circuit chips.

DESCRIPTION OF THE CHARACTERS 100 main LSI
111 master A
112 master B 113 master C
120, 121 arbitration circuit of main LSI
130, 131 access signal generation circuit of main LSI
200 sub LSI
211 master a
212 master b
213 master c
220, 221 arbitration circuit of sub LSI
230, 231 access signal generation circuit of sub LSI
300 SDRAM

BEST MODE FOR CARRYING OUT THE
INVENTION

Embodiment
Overview

Figure 1:
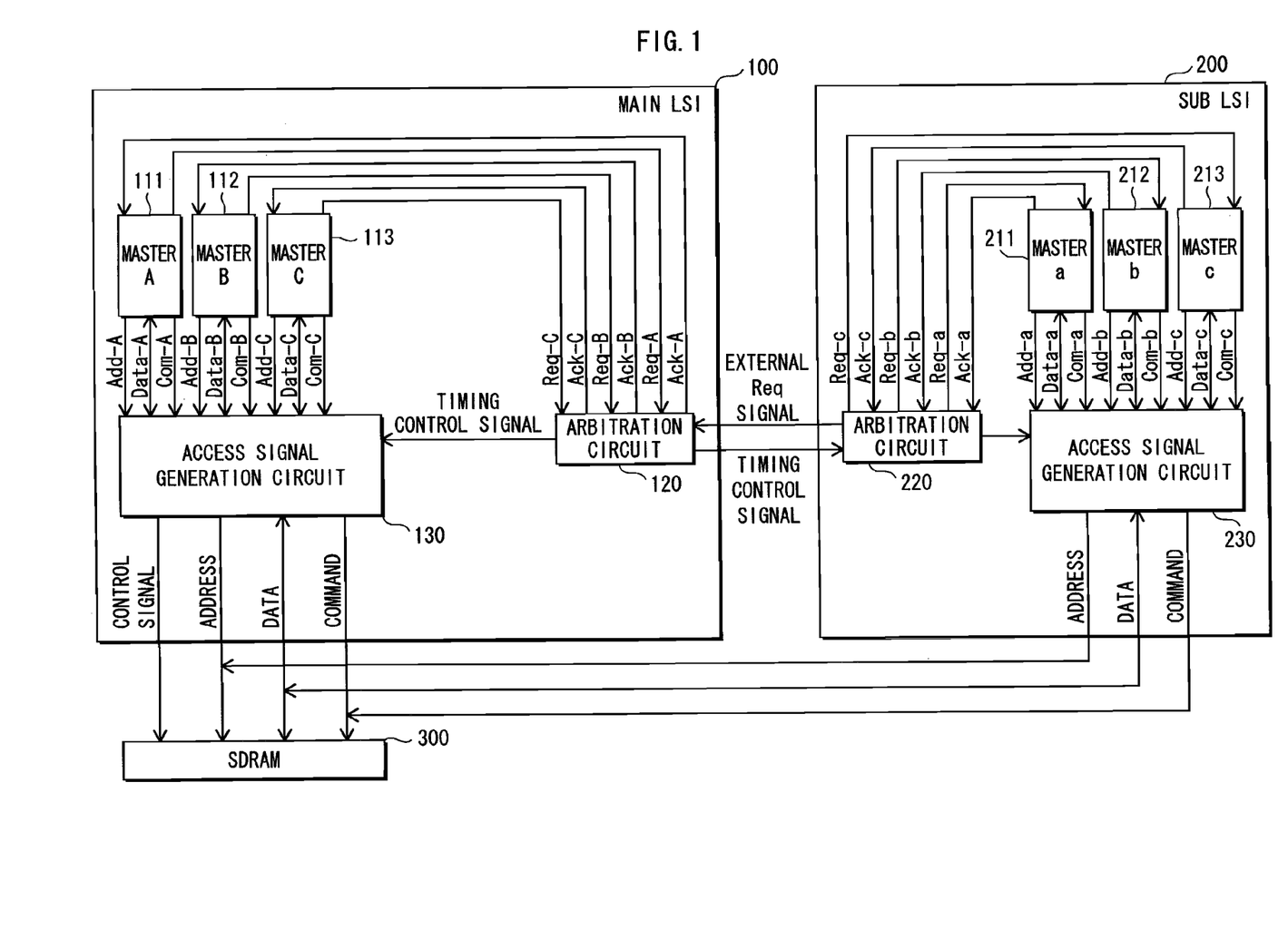
FIG. 1 shows a structure of an integrated circuit system of the embodiment.

FIG. 1 shows a structure of an integrated circuit system constituted from a main LSI (Large Scale Integration) and a sub LSI pertaining to the embodiment, as well as an SDRAM shared by the main LSI and the sub LSI.

The main LSI 100 and sub LSI 200 shown in Fig. 1 are included in, for example, a data processing apparatus that performs operations pertaining to imaging processing etc. in a digital information device. Both the main LSI 100 and sub LSI 200 are included in the same apparatus.

Also, masters A to C and masters a to c shown in Fig. 1 are, for example, CPUs that use an SDRAM 300 as a main storage device, or DSPs (Digital Signal Processors) that store image data etc. in the SDRAM 300 shown in Fig. 1. The master circuits in the main LSI 100 and sub LSI 200 share the SDRAM 300.

In a case where requests to access the SDRAM 300 (Read requests or Write requests) are output by the master circuits in the main LSI 100 and sub LSI 200 of the present invention, the data processing apparatus including the LSIs 100 and 200 causes the main LSI 100 to arbitrate the access requests and determines SDRAM 300 access timings. The main LSI 100 and the sub LSI 200 access the SDRAM 300 in accordance with the result of the arbitration and the access timings.

Note that the data processing apparatus including the main LSI 100 and sub LSI 200 includes a clock supply circuit that is not depicted in FIG. 1. The clock supply circuit supplies a clock signal to the main LSI 100, the sub LSI 200, and the SDRAM 300.

Structure

1. SDRAM 300

The SDRAM 300 is a clock synchronous DRAM, and includes a clock input terminal, an address input terminal, a data I/O (Input/Output) terminal, a command input terminal, and a control terminal for startup control etc. The SDRAM 300 is connected to an access signal generation circuit 130 of the main LSI 100 and an access signal generation circuit 230 of the sub LSI 200 by command signal lines connected to the command input terminal, address signal lines connected to the address input terminal, data signal lines connected to the data I/O terminal, and a control signal line connected to the control terminal.

Note that a plurality of data signal lines has been provided so that data can be exchanged with the SDRAM 300 in parallel.

The SDRAM 300 receives command signals indicating commands (Write or Read), address signals indicating addresses, and data signals indicating data from the main LSI 100 and the sub LSI 200 via the corresponding terminals in accordance with timings based on the clock.

Also, in accordance with a command indicated by a received command signal and at a preset timing, the SDRAM reads data stored at an address indicated by a received address signal, or writes data indicated by a received data signal to an address indicated by a received address signal.

Note that in the present embodiment, if a Read command is received, the SDRAM 300 begins reading data at a timing that is two clock cycles after the Read command was received, and if a Write command is received, the SDRAM 300 begins writing data at a timing that is one clock cycle after the Write command was received.

2. Main LSI 100

The main LSI 100 shown in FIG. 1 includes a master A 111, a master B 112, a master C 113, an arbitration circuit 120, and the access signal generation circuit 130. The main LSI 100 is connected to the SDRAM 300 and furthermore to the sub LSI 200.

The following describes the constituent elements of the main LSI 100.

Masters A to C

As mentioned above, the master circuits A 111, B 112, and C 113 are CPUs, DSPs or the like, and independently transfer data to the SDRAM 300.

The master circuits A, B, and C are connected to the arbitration circuit 120 by Req signal lines Req-A, Req-B, and Req-C respectively, and by Ack signal lines Ack-A, Ack-B, and Ack-C respectively. Furthermore, the master circuits A, B, and C are connected to the access signal generation circuit 130 by Com signal lines Com-A, Com-B, and Com-C for transmitting commands to the SDRAM 300, by Data signal lines Data-A, Data-B, and Data-c for exchanging data with the SDRAM 300, and by Add signal lines Add-A, Add-B, and Add-C for designating addresses in the SDRAM 300.

When requesting data transfers, the master circuits transmit access requests including information such as commands and data transfer amounts to the arbitration circuit 120 via the corresponding Req signal lines.

Also, the master circuits receive response signals, in response to the transmitted access requests, from the arbitration circuit 120 via the corresponding Ack signal lines. The master circuits transmit commands, addresses and data pertaining to the transmitted access requests to the access signal generation circuit 130 via the corresponding Com signals lines, Add signal lines, and Data signal lines. If another data transfer becomes necessary, the master circuits transmit the next access request to the arbitration circuit 120 when the response signal to the previous access request was received from the arbitration circuit 120.

Arbitration Circuit 120

As described above, the arbitration circuit 120 is connected to the master circuits (A to C) by the Req signal lines and the Ack signal lines, and is connected to the access signal generation circuit 130 by a timing control signal line for the transmission of access timings which includes an arbitration result. Also, the arbitration circuit 120 is connected to the sub LSI 200 by an external Req signal line for receiving SDRAM 300 access requests from the sub LSI 200, and by a timing control signal line for transmitting SDRAM 300 access timings.

Note that separate timing control signal lines are provided in the main LSI 1000 for the transmission of access timings to each of the master circuits (A to C).

The arbitration circuit 120 receives access requests from the master circuits via the corresponding Req signal lines, and also receives access requests from the sub LSI 200. The arbitration circuit 120 stores access request information pieces indicating the received access requests to a buffer not depicted in FIG. 1, in the order in which the access requests were received.

In the present embodiment, the buffer is, for example, a FIFO buffer. Also, each access request information piece stored in the buffer includes information for identifying an access request source, a command type, and information indicating a data transfer amount pertaining to the access request, in correlation with each other.

Also, after the access request information pieces have been stored in the buffer, the arbitration circuit 120 selects, in accordance with a preset arbitration rule, one of the master circuits (A to C) or the sub LSI 200 as a target for being allowed to transfer data to the SDRAM 300 based on the corresponding access request information piece. The preset arbitration rule indicates, for example, that access is to be performed according to an order in which the access requests were received.

Furthermore, the arbitration circuit 120 calculates a number of clock cycles required for each data transfer indicated in the access request information piece stored in the buffer, based on the data transfer amounts indicated by the access request information pieces and a default number of bits that can be transmitted in parallel. Based on the calculated number of clock cycles and in accordance with timings based on the clock signal, the arbitration circuit 120 determines timings according to which sequentially selected master circuits or the sub LSI 200 are to transmit command signals and address signals to the SDRAM 300, so that data transfers pertaining to access requests are performed in uninterrupted succession.

In other words, the arbitration circuit 120 determines timings according to which command signals and address signals are to be output, such that while the data signal pertaining to one data transfer is being output, a master circuit selected to perform the next data transfer outputs the command signal and address signal of the access request pertaining to this next data transfer. As a result, data transfers pertaining to access requests are performed in uninterrupted succession as much as possible. Note that the arbitration circuit 120 determines timings without consideration of whether a master circuit that has output an access request for performing data transfer is an internal master circuit, and without judging whether data transfers pertaining to access requests have been completed.

When determining timings, if the selected master circuit is one of the master circuits in the main LSI 100, the arbitration circuit 120 transmits a timing control signal indicating the determined timing to the access signal generation circuit 130 via the timing control signal line that corresponds to the selected master circuit in the main LSI 100. If the selected master circuit is one of the master circuits in the sub LSI 200, the arbitration circuit 120 transmits a timing control signal indicating the determined timing to the sub LSI 200.

Note that in the present embodiment, the arbitration circuit 120 transmits access timings to the access signal generation circuit 130 and the sub LSI 200 by outputting timing control signals at a LOW level.

Access Signal Generation Circuit 130

As described above, the access signal generation circuit 130 is connected to the master circuits by the Com signal lines, the Add signal lines, and the Data signal lines, is connected to the arbitration circuit 120 by separate timing control signal lines for each of the master circuits, and is connected to the SDRAM 300 by the command signal line, the address signal line, the data signal lines, and the control signal line.

The access signal generation circuit 130 receives commands, addresses, and data pertaining to access requests via the Com signal lines, Add signal lines, and Data signal lines corresponding to the masters A 111, B 112, and C 113, and stores the received commands, addresses, and data in a buffer not depicted in FIG. 1. Based on the stored commands, addresses, and data, the access signal generation circuit 130 generates access signals for performing data transfer with the SDRAM 300.

Here, the generated access signals are signals indicating commands, addresses, and data, as well as command signals such as a control signal for causing the SDRAM 300 to enter an active state and a NOP (NO OPERATION) for allowing a currently executed write burst transfer to be completed.

Upon receiving a LOW-level timing control signal from the arbitration circuit 120, the access signal generation circuit 130 transmits, to the SDRAM 300, an access signal indicating a command from the master circuit that is indicated by the timing control signal which includes arbitration result information (hereinafter, called a "command signal"), and an access signal indicating an address (hereinafter, called an "address signal"), via the command signal line and the address signal line respectively. In the case of a write request, the access signal generation circuit 130 transmits an access signal indicating data (hereinafter, called a "data signal") to the SDRAM 300 via the data signal line at a predetermined timing that is one clock cycle after the output of the command signal.

3. Sub LSI 200

Similarly to the main LSI 100, the sub LSI 200 shown in FIG. 1 includes a master a 211, a master b 212, a master c 213, an arbitration circuit 220, and an access signal generation circuit 230. The sub LSI 200 is connected to the SDRAM 300.

Masters a to c

Similarly to the masters A to C, the masters a to c are CPUs, DSPs or the like. The masters a, b, and c are connected to the arbitration circuit 220 by respective Req signal lines (Req-a, Req-b, and Req-c) and by respective Ack signal lines (Ack-a, Ack-b, and Ack-c), and are connected to the access signal generation circuit 230 by respective Com signal lines (Com-a, Com-b, and Com-c), Add signal lines (Add-a, Add-b, and Add-c), and Data signal lines (Data-a, Data-b, and Data-c).

When transferring data to the SDRAM 300, the master circuits a to c transmit access requests to the arbitration circuit 220 via the corresponding Req signal lines, and receive response signals from the arbitration circuit 220 via the corresponding Ack signal lines. Also, the master circuits a to c transmit commands, address, and data pertaining to the access requests that were transmitted to the arbitration circuit 220, to the access signal generation circuit 230 via the corresponding signal lines.

Arbitration Circuit 220

As described above, the arbitration circuit 220 is connected to the master circuits (a to c) by the Req signal lines and the Ack signal lines, and is connected to the main LSI 100 by an external Req signal line and a timing control signal line. Also, the arbitration circuit 220 is connected to the access signal generation circuit 230 by a signal line for the transmission of master specification information indicating the master circuit that is to transfer data to the SDRAM 300.

The arbitration circuit 220 receives access requests from the master circuits (a to c), stores access request information in a buffer not depicted in FIG. 1 in the order in which the access requests were received. Also, the arbitration circuit 220 sequentially selects, in accordance with a preset arbitration rule, one of the master circuits (a to c) for being allowed to transfer data to the SDRAM 300. The preset arbitration rule indicates, for example, that access is to be performed according to the order in which the access requests were received.

Also, the arbitration circuit 220 transmits, to the main LSI 100, information indicating a command, a data transfer amount, and an address in the access request information pertaining to the selected master circuit, and stores a result of the selection.

Upon receiving a LOW-level timing control signal from the main LSI 100, the arbitration circuit 220 specifies one of the master circuits based on the stored selection result, and transfers master specification information indicating the specified master circuit to the access signal generation circuit 230.

If there is a need to transmit a plurality of access requests to the main LSI 100, upon receiving a LOW-level timing control signal, the arbitration circuit 220 transmits the next access request.

Access Signal Generation Circuit 230

As described above, the access signal generation circuit 230 is connected to the master circuits (a to c) by the Com signal lines, the Add signal lines, and the Data signal lines, and is connected to the arbitration circuit 220 by the signal line for receiving master specification information. The access signal generation circuit 230 is connected to the SDRAM 300 by a command signal line, an address signal line, and data signal lines, which are similar to the signal lines described above.

The access signal generation circuit 230 receives commands, addresses, and data from the master circuits (a to c) via the corresponding Com signal lines, Add signal lines, and Data signals lines, generates access signals for accessing the SDRAM 300, and stores the generated access signals in a buffer.

Also, the access signal generation circuit 230 receives master specification information from the arbitration circuit 220, transmits the access signals pertaining to the command and address received from the master circuit indicated in the received master specification information to the SDRAM 300 via the corresponding signal lines, and at a timing in accordance with the command (e.g., in the case of a data write request, a timing that is one clock cycle after the input of the command), transmits a data signal to the SDRAM 300 via the corresponding data signal line.

Data

FIG. 2(a) shows exemplary access request information that has been received from the master circuits (A to C) and stored in the FIFO buffer of the arbitration circuit 120. As shown in FIG. 2(a), access requests have been received from the master A 111, master B 112, and master C 113 in the stated order.

Access request information 10 is information including reception order 11, Req signal line 12, command 13, and transfer amount 14 in correlation with each other.

Here, reception order 11 shows the order in which the access requests were received by the arbitration circuit 120 for the sake of convenience in the description, and access request information that has been retrieved from the buffer is assumed to no longer be stored in the buffer.

Req signal line 12 is information for identifying the transmission sources of access requests, and indicates Req signal lines by which the access requests have been received.

Command 13 indicates commands for reading data from or writing data to the SDRAM 300. For example, "Write" is described in command 13 in the case of a data write request, and for the sake of convenience in the description, letters that identify the master circuits have been appended, as in the example of "WriteA".

Transfer amount 14 indicates the amount of data the master circuits need to transfer to the SDRAM 300. In the present embodiment, the data amounts are expressed in units of bytes.

Note that in the case of the present embodiment, the number of bits that can be transmitted in parallel is 16 bits. For example, in the case of transferring 4 bytes of data, two data transfer cycles would be required.

FIG. 2(b) shows exemplary access request information received from the master circuits (a to c) and stored in the buffer of the arbitration circuit 220. As shown in FIG. 2(b), access requests have been received from the master b 212, master a 211, and master c 213 in the stated order.

A description of access request information 20 shown in FIG. 2(b) has been omitted due to being the same as the access request information 10 shown in FIG. 2(a).

FIG. 2(c) shows exemplary access request information that has been received by the arbitration circuit 120 of the main LSI 100 from the master circuits (A to C) and sub LSI 200, and stored in the buffer of the arbitration circuit 120. As shown in FIG. 2(c), access request information has been received from the master A 111, the sub LSI 200, and the master C 113 in the stated order.

A description of access request information 30 shown in FIG. 2(c) has also been omitted due to being the same as the access request information 10 shown in FIG. 2(a).

Operations

Figure 2:
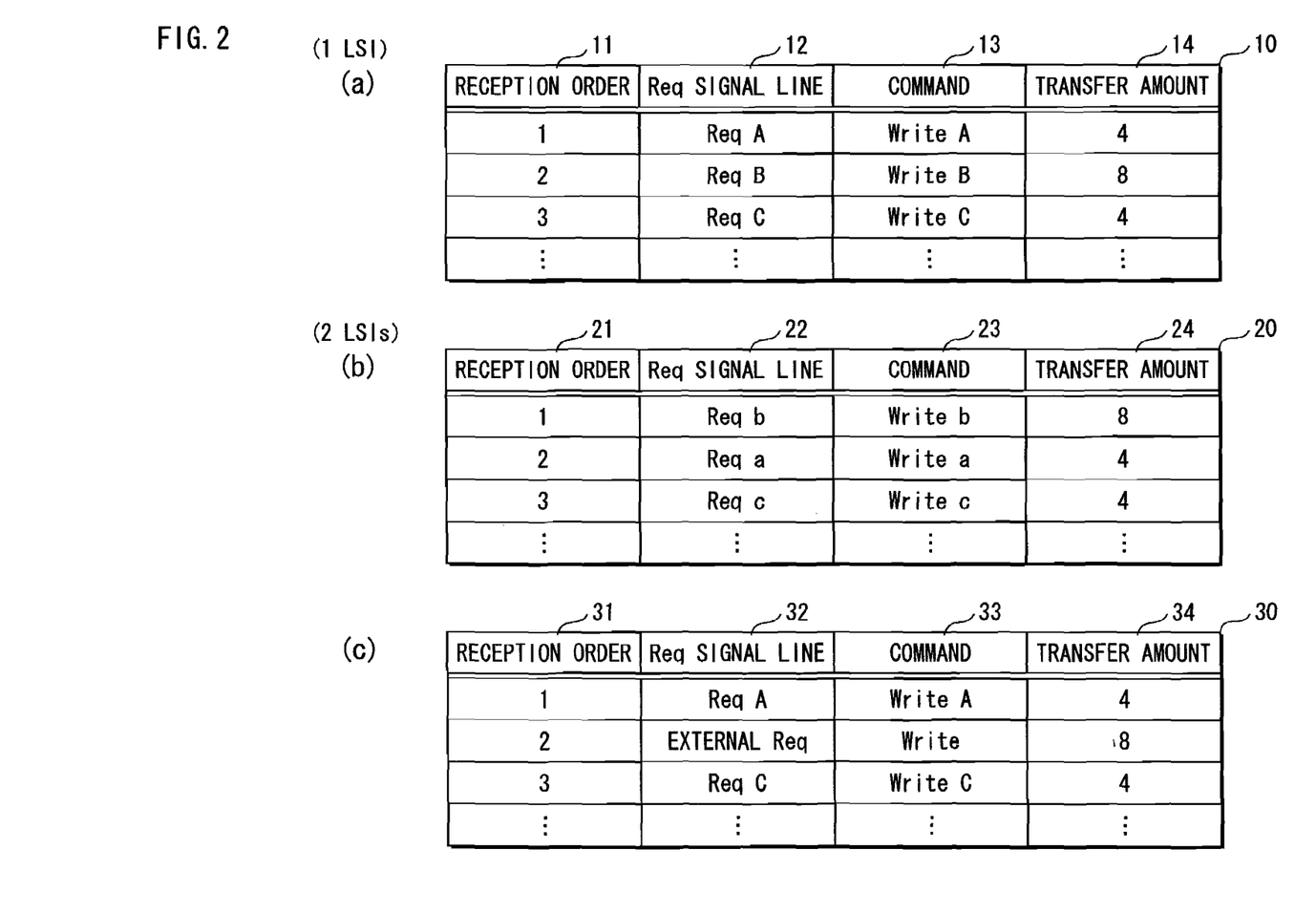
FIG. 2(a) shows exemplary access request information stored in a buffer of an arbitration circuit 120 in a case of access being performed by only a main LSI 100 of the embodiment.
FIG. 2(b) shows exemplary access request information stored in a buffer of an arbitration circuit 220 in a case of access requests being output by the main LSI 100 and a sub LSI 200 of the embodiment.
FIG. 2(c) shows exemplary access request information stored in the buffer of the arbitration circuit 120 in a case of access requests being output by the main LSI 100 and the sub LSI 200 of the embodiment.
Figure 3:
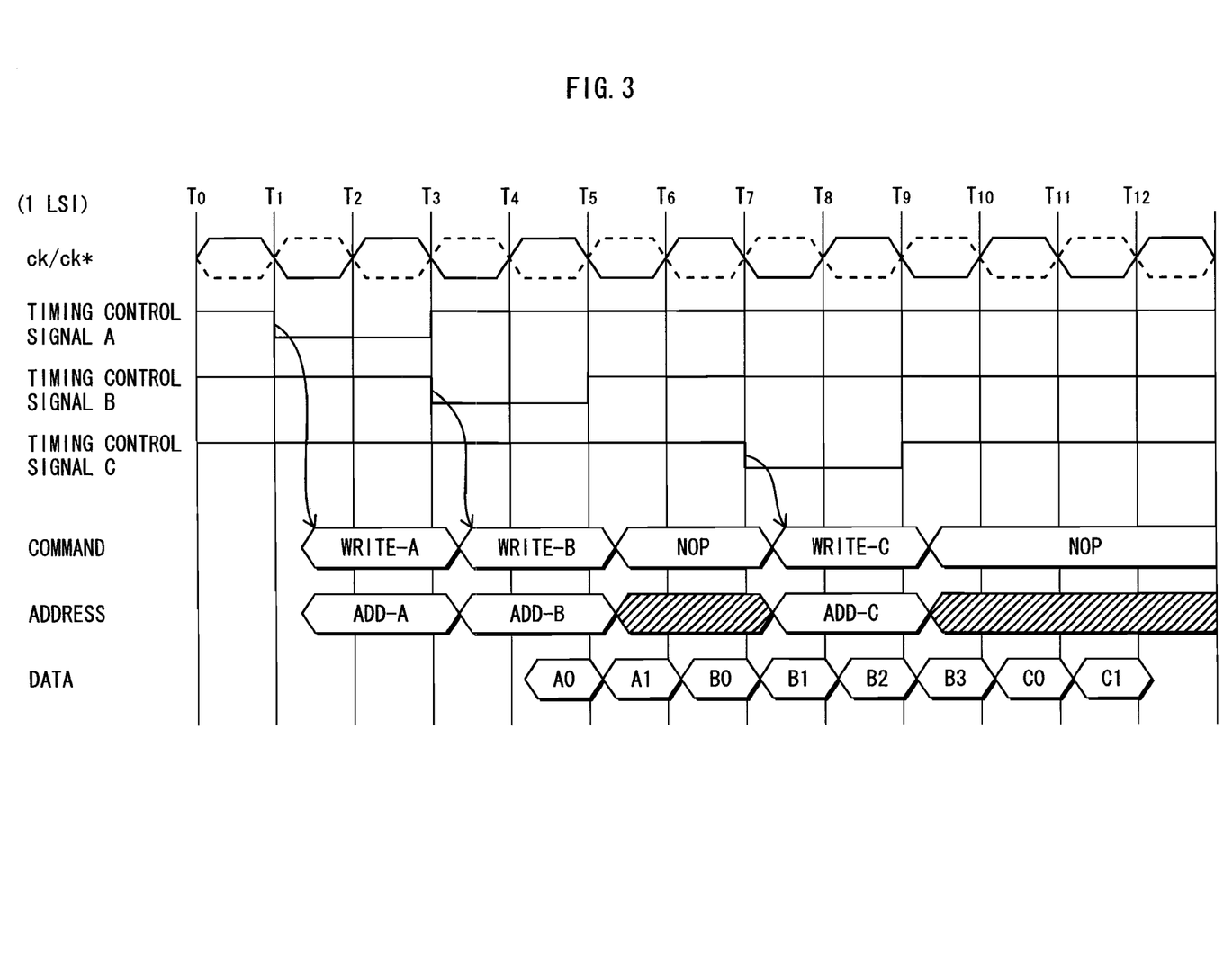
FIG. 3 is a timing chart showing timings of data transfer control in a case where access requests are received from only the main LSI 100.
Figure 4:
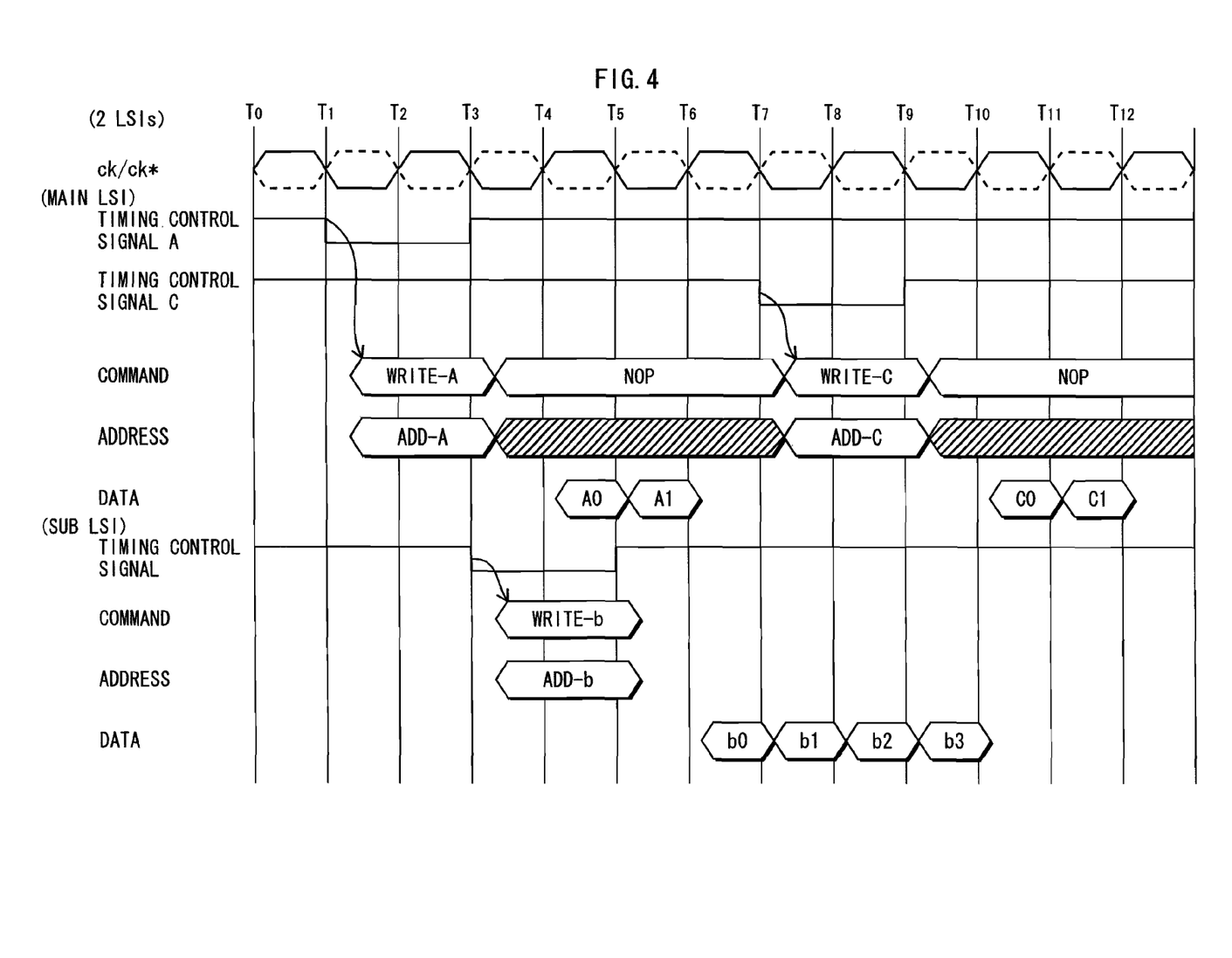
FIG. 4 is a timing chart showing timings of data transfer control in a case where access requests are received from the main LSI 100 and the sub LSI 200.

The following describes operations performed by the main LSI 100 and the sub LSI 200 having the above-described structures with reference to FIGS. 2 to 4.

Note that the SDRAM 300 used in the present example of operations is DDR SDRAM (Double Data Rate Synchronous DRAM). In the timings charts of FIGS. 3 and 4, ck and /ck* are clocks according to which the SDRAM 300 operates, /ck* is synchronized to ck, the signal phase of /ck* is opposite that of ck, ck is indicated by a solid line, and /ck* is indicated by a broken line. Also, the SDRAM 300 controls the input and output of data in synchronization with both the rising edges and falling edges of the clock (ck), and commands are latched in synchronization with intersections between the rising edges of the clock (ck) and the falling edges of the clock (/ck*). Furthermore, the burst length is four cycles, and in the case of a data write request, data writing begins one clock cycle after the input of the Write command.

Operations in a Case of One LSI

FIG. 3 is a timing chart showing timings according to which to the arbitration circuit 120 that has received access requests from the masters A to C controls data transfers to the SDRAM 300.

FIG. 3 is based on the access request information 10 shown in FIG. 2(a), and shows a result of the arbitration circuit 120 controlling data transfers to the SDRAM 300 performed by the masters A to C. Note that the SDRAM 300 has been caused to enter an active state in advance. In the timing chart of FIG. 3, in the exemplary case of the access signals pertaining to the data write request from the master A 111, the command signal is indicated by WRITE-A, the address signal is indicated by ADD-A, and the data signal is indicated by A0.

The following describes operations performed by the arbitration circuit 120 and the access signal generation circuit 130.

The arbitration circuit 120 receives, from the masters A to C, the Write requests indicated in the access request information 10 of FIG. 2(a) in the stated order via the corresponding Req signal lines, and stores the received Write requests in the buffer. Each time one of the Write requests is received, the arbitration circuit 120 calculates a number of cycles required to perform the data transfer, based on the data transfer amount pertaining to the Write request and the number of bits that can be transmitted in parallel.

The arbitration circuit 120 specifies the master circuits from which the access requests have been received based on the Req signal lines via which the access requests were received, determines timings according to which the specifies master circuits are to input commands and address to the SDRAM 300, and at the determined timings, transmits timing control signals including arbitration result information to the access signal generation circuit 130.

In the example shown in FIG. 2(a), the arbitration circuit 120 first specifies the master A that transmitted an access request via the Req-A signal line.

In order to allow the data transfer requested by the master A, at timing T1 in FIG. 3, the arbitration circuit 120 transmits a LOW-level timing control signal to the access signal generation circuit 130 via the timing control signal line corresponding to the master A 111. Upon receiving the timing control signal, the access signal generation circuit 130 inputs the command signal WRITE-A and the address signal ADD-A pertaining to the master A 111 to the SDRAM 300 at the rising edge of the clock (ck) at timing T2.

Also, as shown in FIG. 3, the access signal generation circuit 130 inputs the data signals A0 and A1 to the SDRAM 300 at a rising edge and a falling edge of the clock (ck) after timing T4, which is one clock cycle after the input of the command signal WRITE-A and address signal ADD-A.

In the example of FIG. 2(a), the arbitration circuit 120 specifies the master B 112 as the master circuit that is allowed to access the SDRAM 300 after the master A 111.

Since two data transfer cycles are required for the data transfer from the master A 111, at timing T3 the arbitration circuit 120 transmits a LOW-level timing control signal to the access signal generation circuit 130 via the timing control signal line corresponding to the master B 112, so that the input of the data signal pertaining to the master B 112 can begin at the rising edge at timing T6 at which the input of the data signal pertaining to the master A 111 ends.

Upon receiving the timing control signal, the access signal generation circuit 130 inputs a command signal WRITE-B and an address signal ADD-B pertaining to the master B 112 to the SDRAM 300 at the rising edge of the clock (ck) at timing T4. Also, the access signal generation circuit 130 generates NOP signals until the next timing control signal is received, and inputs the NOP signals beginning from the rising edge of the clock (ck) at timing T6.

Next, the access signal generation circuit 130 inputs data signals B0 to B3 to the SDRAM 300 at rising edges and falling edges of the clock (ck) after timing T6, which is one clock cycle after the input of the command signal WRITE-B and address signal ADD-B.

Next, in the example of FIG. 2(a), the arbitration circuit specifies the master C 113 as the master circuit that is allowed to access the SDRAM 300 after the master B 112. Since four data transfer cycles are required for the data transfer from the master B 112, at timing T7 the arbitration circuit 120 transmits a LOW-level timing control signal to the access signal generation circuit 130 via the timing control signal line corresponding to the master C 113, so that the input of the data signal pertaining to the master C 113 can begin at the rising edge of the clock (ck) at timing T10 at which the input of the data signal pertaining to the master B 112 ends.

Upon receiving the timing control signal, the access signal generation circuit 130 inputs a command signal WRITE-C and an address signal ADD-C pertaining to the master C 113 to the SDRAM 300 at the rising edge of the clock (ck) at timing T8. Also, the access signal generation circuit 130 generates NOP signals until the next timing control signal is received, and inputs the NOP signals beginning from the rising edge of the clock (ck) at timing T6. Also, the access signal generation circuit 130 inputs data signals C0 and C1 pertaining to the master C 113 to the SDRAM 300 at a rising edge and a falling edge of the clock (ck) at timing T10, which is one clock cycle after the input of the command signal WRITE-C and address signal ADD-C.

In the SDRAM 300, the access signals received at the timings described above are latched at timings based on the clock.

Operations in a Case of Two LSIs

FIG. 4 is a timing chart showing timings according to which the arbitration circuit 120 that has received access requests from the master circuits of the main LSI 100 and sub LSI 200 controls data transfers to the SDRAM 300.

FIG. 4 is based on the access request information 30 shown in FIG. 2(c), and shows a result of the arbitration circuit 120 controlling data transfers to the SDRAM 300 performed by the master circuits of the main LSI 100 and sub LSI 200.

As described above, the access request information 20 shown in FIG. 2(b) indicates access requests that have been received by the arbitration circuit 220 of the sub LSI 200. The arbitration circuit 220 selects the master b 212 that was the first to transmit an access request via the Req-b signal line, transmits an access request including information that indicates a command "Write b" and a transfer amount "8 bytes" to the main LSI 100 via the external Req signal line, and furthermore stores a selection result indicating the master b 212.

The following describes operations performed by the arbitration circuits and access signal generation circuits of the main LSI 100 and sub LSI 200 with reference to FIG. 4.

According to the access request information 30 of FIG. 2(c), the arbitration circuit 120 of the main LSI 100 specifies the master A 111 from which an access request was received first.

Similarly to the operations in the above case of one LSI, at timing T1 in FIG. 4 the arbitration circuit 120 transmits a LOW-level timing control signal to the access signal generation circuit 130 via the timing control signal line corresponding to the master A 111, and at timing T2 the access signal generation circuit 130 inputs the command signal WRITE-A and the address signal ADD-A to the SDRAM 300.

Also, the access signal generation circuit 130 inputs the data signals A0 and A1 to the SDRAM 300 at a rising edge and a falling edge of the clock (ck) after timing T4, which is one clock cycle after the input of the command signal WRITE-A and address signal ADD-A.

Next, according to the access request information 30 of FIG. 2(c), "EXTERNAL Req" is the Req signal line via which the next access request is received. The arbitration circuit 120 therefore selects the sub LSI 200 as the access target. Since two data transfer cycles are required for the data transfer from the master A 111, at timing T3 the arbitration circuit 120 transmits a LOW-level timing control signal to the sub LSI 200, so that the input of data from the sub LSI 200 can begin at the rising edge at timing T6 at which the input of the data signal pertaining to the master A 111 ends.

Upon receiving the timing control signal from the main LSI 100, the arbitration circuit 220 of the sub LSI 200 specifies the master b 212 based on the stored selection result, and transmits master specification information indicating the master b 212 to the access signal generation circuit 230.

Upon receiving the master specification information, the access signal generation circuit 220 inputs, to the SDRAM 300, a command signal WRITE-b and an address signal ADD-b pertaining to the master b 212 indicated in the master specification information at the rising edge of the clock (ck) at timing T4.

Also, the access signal generation circuit 230 inputs data b0 to b3 pertaining to the master b 212 to the SDRAM 300 at rising edges and falling edges of the clock (ck) after timing T6, which is one clock cycle after the input of the command signal WRITE-b and address signal ADD-b.

Note that after the command signal WRITE-A and address signal ADD-A have been input, the access signal generation circuit 130 of the main LSI 100 inputs NOP signals to the SDRAM 300 from the rising edge of the clock (ck) at timing T4 until the next access control signal is received.

Next, according to the access request information 30 of FIG. 2(*c*), the arbitration circuit 120 of the main LSI 100 specifies the master C 113 as the access target.

Since four data transfer cycles are required for the data transfer from the sub LSI 200, at timing T7 the arbitration circuit 120 transmits a LOW-level timing control signal to the access signal generation circuit 130 via the timing control signal line corresponding to the master C 113, so that the data transfer from the master C 113 can begin at the rising edge of the clock (ck) after timing T10 at which the input of the data signal pertaining to the sub LSI 200 ends.

Upon receiving the timing control signal, the access signal generation circuit 130 inputs the command signal WRITE-C and the address signal ADD-C pertaining to the master C 113 to the SDRAM 300 at the rising edge of the clock (ck) at timing T8.

Also, the access signal generation circuit 130 inputs the data C0 and C1 pertaining to the master C 113 to the SDRAM 300 at a rising edge and a falling edge of the clock (ck) after timing T10, which is one clock cycle after the input of the command signal WRITE-C and address signal ADD-C.

Considerations

Figure 6:
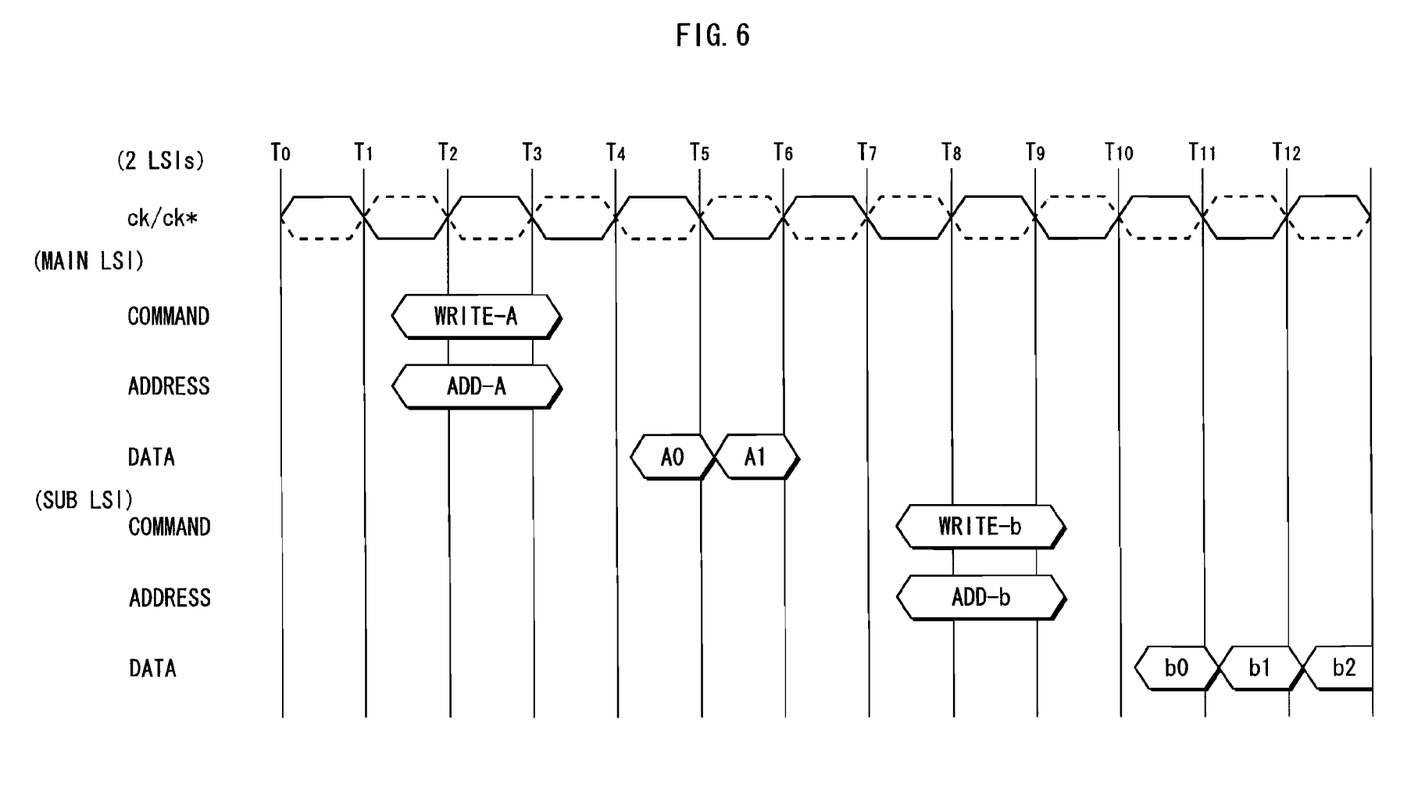
FIG. 6 illustrates the example shown in FIG. 4 of the embodiment, in a case in which conventional technology is used.

FIG. 6 shows the example of FIG. 4 described in the embodiment, in a case of using conventional technology.

In the example of FIG. 6, the command signal and address signal pertaining to the access request from the master b in the sub LSI 200 are not output to the SDRAM 300 until the data transfer based on the access request from the master A of the main LSI 100 has ended. For this reason, data transfers based on access requests output from the master circuits in the main LSI 100 and sub LSI 200 are not performed in uninterrupted succession.

As shown in FIG. 4, in the above embodiment the arbitration circuit 120 of the main LSI 100 receives access requests from master circuits in the main LSI 100 and sub LSI 200. In order to enable a data transfer from the master b of the sub LSI 200 to be performed in uninterrupted succession after the data transfer from the master A of the main LSI 100 has ended, the arbitration circuit 120 determines timings so that a command and an address pertaining to the data transfer from the master b are output a predetermined period of time before the timing of the data transfer from the master b. The arbitration circuit 120 performs similar processing when the access target switches from the master b to the master C.

In this way, since no consideration is given to whether there is overlap between the data transfer period of the master circuit that has been selected to access the SDRAM and the output period of a command and address pertaining to an access request from the master circuit that is to perform a next data transfer, the command and address pertaining to the next data transfer can be output in parallel with the current data transfer. As a result, similarly to the case of a single integrated circuit, data transfers from master circuits selected to access the SDRAM are performed in uninterrupted succession, thereby raising data transfer efficiency over conventional technology.

Note that although the above embodiment only describes a case of data writing, a case of data reading is performed in a similar manner.

Modifications

Figure 5:
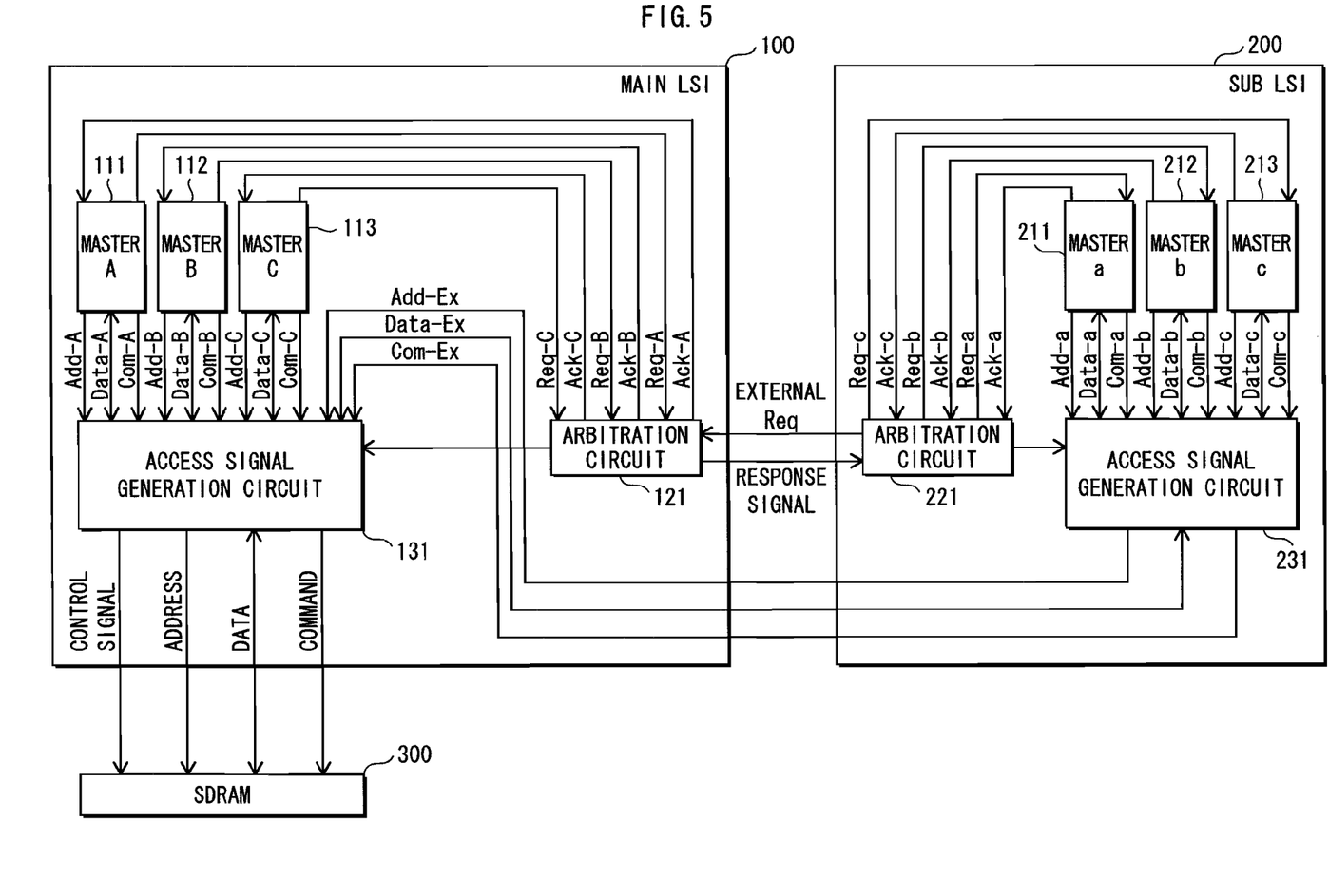
FIG. 5 shows a structure of an integrated circuit system pertaining to a variation of the embodiment.

FIG. 5 shows the structure of an integrated circuit system pertaining to a modification of the embodiment described above.

In the integrated circuit system pertaining to the above embodiment, the arbitration circuit in the main LSI 1000 performs arbitration as well as determines access timings for access requests, and access to the SDRAM 300 by the access signal generation circuits in the main LSI 100 and sub LSI 200 are performed in accordance with the determined timings. However, in the present modification, the access signal generation circuit of the main LSI 100 determines access timings for access requests, and transfers data to the SDRAM 300.

The following describes the integrated circuit system of the present modification.

Similarly to the above embodiment, an arbitration circuit 121 of the main LSI 100 pertaining to the present modification sequentially selects master circuits or the sub LSI 200 that are to be allowed to access the SDRAM 300, in accordance with a predetermined rule. The arbitration circuit 121 transmits only arbitration result information indicating the result of the selection to an access signal generation circuit 131 of the main LSI 100, and transmits a response signal indicating that an access request has been received to the sub LSI 200.

Similarly to the above embodiment, an arbitration circuit 221 of the sub LSI 200 receives the response signal, specifies which of the master circuits (a to c) is the transmission source of the access request corresponding to the response signal, and transmits master specification to an access signal generation circuit 231.

The access signal generation circuit 231 generates access signals indicating the command, address, and data from the master circuit indicated in the master specification information, and transmits the generated access signals to the access signal generation circuit 131 of the main LSI 100.

Similarly to the above embodiment, the access signal generation circuit 131 of the main LSI 100 generates access signals for the master circuits (A to C) of the main LSI 100. Based on the arbitration result information, the access signal generation circuit 131 transmits the generated access signals and the access signals received from the sub LSI 200 to the SDRAM so that data transfers pertaining to the access requests are performed in uninterrupted succession.

Supplementary Remarks

Although an LSI of the present invention has been described based on the above embodiment, modifications such as the following are also applicable, and the present invention should not be limited to the LSI described in the above embodiment.

(1) In the embodiment, the arbitration circuit 120 performs arbitration in accordance with an arbitration rule which prescribes that master circuits requesting access to the SDRAM 300 are to be specified in the order in which the access requests were received. However, the arbitration rule may be, for example, a user-determined priority order indicating master circuits for which access requests are to be prioritized, or information indicating an arbitration rule may be acquired from the sub LSI 200 and used to dynamically change the arbitration of access requests.

(2) In the embodiment, access control operations include receiving access requests from the master circuits, specifying the master circuits that are access to the SDRAM 300, and transmitting the commands, addresses, and data from the master circuit specified by the arbitration circuit to the SDRAM, and these access control operations are divided between the arbitration circuit and the access signal generation circuit. However, these access control operations may be performed by a single circuit.

(3) The embodiment describes a case in which one sub LSI is connected to a main LSI. However, in a case of two or more sub LSIs, the arbitration circuit of the main LSI receives access requests from each of the sub LSIs, performs arbitration in accordance with a predetermined arbitration rule, and transmits timing control signals indicating an arbitration result and access timings to the sub LSIs. The sub LSIs internally generate access signals, and transmit the access signals to the SDRAM in accordance with the timings indicated by the timing control signals.

(4) Although clocks are supplied to the main LSI 100 and the sub LSI 200 in the above embodiment, a clock may be supplied to the main LSI 100, the main LSI 100 may output a clock for phase adjustment, and the sub LSI 200 may perform access in accordance with timings based on the clock output by the main LSI 100.

(5) Although the arbitration circuit 120 determines the timings of data transfers in the main LSI 100 in the above embodiment, the access signal generation circuit 130 may determine the timings of data transfers in the main LSI 100. In this case, the arbitration circuit 120 outputs only arbitration result information to the access signal generation circuit 130, and in accordance with the order indicated in the arbitration result information, the access signal generation circuit 130 transmits signals indicating commands etc. pertaining to access requests from the master circuits in the main LSI 100 in accordance with timings based on the clock. Also, the arbitration circuit 120 monitors the condition of data transfers between the access signal generation circuit 130 and the SDRAM 300, and based on the condition of data transfers to the SDRAM 300, determines access timings for the sub LSI 200 so that data transfers pertaining to access requests from the master circuits in the main LSI 100 and sub LSI 200 are performed in uninterrupted succession, and outputs access timing signals that indicate the determined timings.

(6) Although the SDRAM 300 is a DDR SDRAM in the above embodiment, the SDRAM 300 may be a DRAM that operates in synchronization with an external clock, such as an SDR SDRAM (Single Data Rate Synchronous DRAM). The SDRAM 300 may be any clock-synchronized recording device that performs data transfers at a predetermined timing after reception of a command.

(7) In the above embodiment, the arbitration circuit 120 and access signal generation circuit 130 of the main LSI 100 are connected by separate timing control signal lines for each of the master circuits (A to C). However, provided that access timings for the master circuits can be transmitted, serial transmission or another type of parallel transmission may be used.

(8) Although the access signal generation circuit 130 of the main LSI 100 in the above embodiment outputs control signals to the SDRAM 300 based on received timing control signals, control signals may be output to the SDRAM 300 from the access signal generation circuit 230 of the sub LSI 200.

(9) In the above embodiment, the master circuits of the main LSI 100 and sub LSI 200 transmit access requests that include data transfer amounts to the arbitration circuits. However, if the data transfer amounts of the master circuits are a fixed length, the master circuits may transmit access requests that do not include data transfer amounts to the arbitration circuits.

Industrial Applicability

An integrated circuit system and integrated circuit of the present invention are applicable to information devices such as an image processing apparatus.

The invention claimed is:

1. An integrated circuit chip comprising:
a plurality of internal master circuits that share an external recording device and that each transmit an access request including an address for a transfer of data to or from the external recording device, such that the integrated circuit chip controls access to the external recording device by the plurality of internal master circuits by selectively causing one internal master circuit of the plurality of internal master circuits to access the external recording device;
an input interface connected to an external master circuit, the input interface receiving an access request from the external master circuit; and
an access control circuit controlling the access to the external recording device by outputting an address indicated by an access request, such that, when the input interface receives the access request from the external master circuit before an end of a data transfer based on the access request transmitted from the one internal master circuit selected by the integrated circuit chip, the access control circuit controls the access by:
(i) determining an output timing for an address indicated by the access request from the external master circuit, the output timing being determined so that the address indicated by the access request from the external master circuit is output during the data transfer in accordance with the access request transmitted from the one internal master circuit selected by the integrated circuit chip;
(ii) outputting the address indicated by the access request from the external master circuit at the determined output timing; and
(iii) causing the external master circuit to access the external recording device.

2. The integrated circuit chip of claim 1,
wherein the integrated circuit chip includes an output interface externally outputting timing information that indicates the output timing for the address indicated by the access request from the external master circuit,
wherein the access control circuit includes:
an arbitration circuit that, when access requests have been received from the external master circuit and one or more of the plurality internal master circuits, sequentially (i) selects, from among the external master circuit and the one or more internal master circuits from which the access requests have been received, a master circuit to be caused to access the external recording device, and (ii) determines an output timing for an address indicated by the access request received from the selected master circuit; and
an access signal generation circuit generating an access signal in accordance with the access request received from the one internal master circuit selected by the integrated circuit chip,
wherein, when the arbitration circuit selects the external master circuit as the master circuit to be caused to access the external recording device, the output interface outputs the timing information indicating the output timing for the address indicated by the access request received from the external master circuit,
wherein, when the arbitration circuit selects an internal master circuit of the plurality of internal master circuits as the master circuit to be caused to access the external recording device, the arbitration circuit outputs an arbitration result indicating the internal master circuit selected by the arbitration circuit to the access signal generation circuit, and wherein the access signal generation circuit generates the access signal in accordance with the selected internal master circuit indicated by the arbitration result, and outputs the generated access signal to the external recording device.

3. An integrated circuit chip comprising:

a plurality of internal master circuits that share an external recording device and that each transmit an access request including an address for a transfer of data to or from the external recording device, such that the integrated circuit chip controls access to the external recording device by the plurality of internal master circuits by selectively causing one internal master circuit of the plurality of internal master circuits to access the external recording device;

an input interface connected to an external master circuit, the input interface receiving an access request from the external master circuit; and an access control circuit controlling the access to the external recording device by outputting an address indicated by an access request, such that, with reference to access requests received from the external master circuit and one or more of the plurality of internal master circuits, the access control circuit controls the access in accordance with a predetermined condition by:

(i) selecting one of the plurality of internal master circuits and causing the selected internal master circuit to perform a data transfer with the external recording device;

(ii) causing the external master circuit to perform a data transfer with the external recording device after the data transfer performed by the selected internal master circuit;

(iii) determining a respective output timing for each respective address pertaining to the access requests to be a predetermined time period prior to a timing of the data transfer pertaining to the respective address, regardless of whether the determined output timing overlaps with another data transfer;

(iv) outputting each respective address pertaining to the access requests at the determined respective output timing; and (v) causing the plurality of internal master circuits and the external master circuit to access the external recording device.

4. An integrated circuit chip comprising:

a plurality of internal master circuits that share an external recording device and that each transmit an access request including an address for a transfer of data to the external recording device, such that the integrated circuit chip controls access to the external recording device by the plurality of internal master circuits by selectively causing one internal master circuit of the plurality of internal master circuits to access the external recording device;

an output interface outputting access requests to an external device;

an input interface connected to the external device, the input interface receiving, from the external device, timing information that indicates a plurality of output timings in one-to-one correspondence with addresses indicated by the access requests output to the external device; and an access control circuit (i) receiving the access requests from the plurality of internal master circuits, (ii) causing the output interface to sequentially output the received access requests to the external device in accordance with a predetermined rule, (iii) receiving the timing information from the input interface, and (iv) performing control to cause the plurality of internal master circuits that transmitted the access requests to perform access in accordance with the received timing information.

5. The integrated circuit chip of claim 1, wherein the external recording device is an SDRAM (Synchronous Dynamic Random Access Memory).

6. An integrated circuit system including a first integrated circuit chip and a second integrated circuit chip that share an external recording device, wherein the first integrated circuit chip comprises:

a plurality of master circuits each transmitting an access request including an address for a transfer of data to the external recording device;

an input interface connected to a master circuit of the second integrated circuit chip, the input interface receiving an access request from the master circuit of the second integrated circuit chip;

an output interface outputting, to the second integrated circuit chip, timing information that indicates an output timing for an output of an address to the external recording device; and an access control circuit controlling access to the external recording device by outputting an address indicated by an access request, such that, when the input interface receives the access request from the master circuit of the second integrated circuit chip before an end of a data transfer based on an access request transmitted from one master circuit, of the plurality of master circuits of the first integrated circuit chip, selected by the first integrated circuit chip, the access control circuit controls the access by:

(i) determining an output timing for an address indicated by the access request from the master circuit of the second integrated circuit chip, the output timing being determined so that the address indicated by the access request from the master circuit of the second integrated circuit chip is output during the data transfer in accordance with the access request transmitted from the one master circuit of the first integrated circuit chip selected by the first integrated circuit chip;

(ii) outputting the address indicated by the access request from the master circuit of the second integrated circuit chip at the determined output timing; and (iii) causing the master circuit of the second integrated circuit chip to access the external recording device, and wherein the second integrated circuit chip comprises:

a plurality of master circuits each transmitting an access request including an address for a transfer of data to the external recording device;

an output interface outputting access requests from the plurality of master circuits of the second integrated circuit chip to the first integrated circuit chip;

an input interface receiving the timing information from the first integrated circuit chip; and an access control circuit (i) receiving the access requests from the plurality of master circuits of the second integrated circuit chip, (ii) causing the output interface of the second integrated circuit chip to sequentially output the access requests received by the access control circuit of the second integrated circuit chip to the first integrated circuit chip in accordance with a predetermined rule, (iii) receiving the timing information from the input interface of the second integrated circuit chip, and (iv) performing control to cause the plurality of master circuits of the second integrated circuit that transmitted the access requests to perform access to the external recording device in accordance with the received timing information.

7. A data processing apparatus including a first integrated circuit chip, a second integrated circuit chip, and a recording device, wherein the first integrated circuit chip comprises:
- a plurality of master circuits each transmitting an access request including an address for a transfer of data to the recording device;
- an input interface connected to a master circuit of the second integrated circuit chip, the input interface receiving an access request from the master circuit of the second integrated circuit chip;
- an output interface outputting, to the second integrated circuit chip, timing information that indicates an output timing for an output of an address to the recording device; and
- an access control circuit controlling access to the recording device by outputting an address indicated by an access request, such that, when the input interface receives the access request from the master circuit of the second integrated circuit chip before an end of a data transfer based on an access request transmitted from one master circuit, of the plurality of master circuits of the first integrated circuit chip, selected by the first integrated circuit chip, the access control circuit controls the access by:
  - (i) determining an output timing for an address indicated by the access request from the master circuit of the second integrated circuit chip, the output timing being determined so that the address indicated by the access request from the master circuit of the second integrated circuit chip is output during the data transfer in accordance with the access request transmitted from the one master circuit of the first integrated circuit chip selected by the first integrated circuit chip;
  - (ii) outputting the address indicated by the access request from the master circuit of the second integrated circuit chip at the determined output timing; and
  - (iii) causing the master circuit of the second integrated circuit chip to access the recording device, and wherein the second integrated circuit chip comprises:
- a plurality of master circuits each transmitting an access request including an address for a transfer of data to the recording device;
- an output interface outputting access requests from the plurality of master circuits of the second integrated circuit chip to the first integrated circuit chip;
- an input interface receiving the timing information from the first integrated circuit chip; and
- an access control circuit (i) receiving the access requests from the plurality of master circuits of the second integrated circuit chip, (ii) causing the output interface of the second integrated circuit chip to sequentially output the access requests received by the access control circuit of the second integrated circuit chip to the first integrated circuit chip in accordance with a predetermined rule, (iii) receiving the timing information from the input interface of the second integrated circuit chip, and (iv) performing control to cause the plurality of master circuits of the second integrated circuit that transmitted the access requests to perform access to the recording device in accordance with the received timing information.

* * * * *